United States Patent
Eggers et al.

(10) Patent No.: US 6,479,576 B2
(45) Date of Patent: Nov. 12, 2002

(54) TRANSPARENT, DEEP-DRAWABLE AND QUICK-SEALING FILM WITH ULTRAVIOLET-BLOCKING PROPERTIES

(75) Inventors: Holger Eggers, Freiburg (DE); Rainer Brandt, Walsrode (DE)

(73) Assignee: Wolff Walsfode AG (DE)

( * ) Notice: Subject to any disclaimer, the term of this patent is extended or adjusted under 35 U.S.C. 154(b) by 0 days.

(21) Appl. No.: 09/814,557

(22) Filed: Mar. 22, 2001

(65) Prior Publication Data

US 2001/0034397 A1 Oct. 25, 2001

(30) Foreign Application Priority Data

Mar. 29, 2000 (DE) .......................................... 100 15 660

(51) Int. Cl.$^7$ ................................................. C08L 3/22
(52) U.S. Cl. ...................... 524/497; 428/343; 428/346; 428/347; 428/423.5; 428/424.8
(58) Field of Search ................................ 428/343, 346, 428/347, 423.5, 424.8; 524/497

(56) References Cited

U.S. PATENT DOCUMENTS 5,391,609 A * 2/1995 Knoerzer et al. ............ 524/497
5,888,648 A * 3/1999 Donovan et al. ............ 428/347

* cited by examiner

Primary Examiner—Nathan M. Nutter
Assistant Examiner—Travis B. Ribar
(74) Attorney, Agent, or Firm—Norris McLaughlin & Marcus, P.A.

(57) ABSTRACT

Described is a multi-layer film comprising, (a) at least one first layer of polyamide; (b) at least one second layer of polyethylene or an ethylene-copolymerizate containing fine-particulate titanium dioxide, a majority of the titanium dioxide particles having a diameter of between 5 and 30 nm; (c) optionally at least one EVOH-containing third layer; and (d) optionally at least one bonding layer. The multi-layer film has a value of from 5 to 200, as determined from the summation of the product of the following equation (I) for all second layers of the multi-layer film, $$(A \times B) \quad \text{Equation (I)}$$

Equation (I) is calculated for each second layer, A is the thickness of the second layer in micrometers, and B is the weight percent of titanium dioxide present in the second layer, based on the total weight of the second layer. Also described is the use of the film according to the present invention as a packaging material for foodstuffs.

8 Claims, No Drawings

TRANSPARENT, DEEP-DRAWABLE AND QUICK-SEALING FILM WITH ULTRAVIOLET-BLOCKING PROPERTIES

FIELD OF THE INVENTION

The present invention relates to a deep-drawable composite film having a high degree of transparency and good UV-blocking properties. The film according to the invention is particularly suitable for the packaging of packed goods sensitive to UV-radiation (ultraviolet radiation), such as, for example, meat goods, which are presented to the purchaser in a transparent and protective packaging. The invention thus also relates to the use of the composite film for the packaging of foodstuffs.

BACKGROUND OF THE INVENTION

Many foodstuffs are subject to spoilage induced by UV-radiation. Photo-induced oxidative processes in meat goods can be mentioned by way of an example. This spoilage mechanism occurs, for example, in the case of storage in refrigerating counters where light sources which also emit light in the UV-spectrum are used for reasons of costs in many cases.

In this way, in the case of packaging materials which do not ensure UV-protection, the storage time in the counter, also referred to as shelf life in the following, can be considerably reduced. In such cases there is a need for packaging materials which counteract such shelf life reduction, i.e., films which exert an absorption effect in the ultraviolet radiation range.

Due to the easier application of the contents, covering packaging materials comprising a deep-drawn tray and a lid are generally used for meat goods. Both components must possess a high UV-barrier to protect the contents from photo-oxidative spoilage. The films must additionally be highly transparent to enable the consumer to view the offered product and permit the product to be presented as attractively as possible.

The tray film must also possess good drawability for the forming of the tray. Here deep-drawability is to be understood as the ability of a film to permanently assume a contoured shape under the effects of heat and mechanical force and pressure. A measure of the deep-drawability is given in association with the examples according to the invention and comparison examples.

The design of corresponding films according to the prior art will be described in the following. The following stipulations apply to these and all further explanations.

Symbols for plastics materials according to DIN 7728 and ISO 1043-1987(E) are used to describe the polymers contained in the individual layers unless indicated otherwise.

In the case of multi-layer constructions, the layer sequence is represented by a combination of the symbols of the polymers of the corresponding layers or symbols explained elsewhere, separated from one another by double oblique strokes. The side of the sealing layer is always the right side. Only a part of the total layer sequence constituting the construction may also be indicated. In such cases the side of the sealing layer again is always the right and layers or combinations of layers not indicated are represented by three dots, ( . . . ). Similar polymers can be differentiated from one another by numbering, for example in the form PE-LD-1// PE-LD-2//PE-LD-3. Mixtures of different polymers are represented by the symbol + and the combination of the components in brackets ( ). Optionally, additional indications of the percentage composition can also be given. Unless otherwise stated, these are always weight percentages relating to the total weight of the mixture. Thus, for example, the term . . . //PA//E/VOH// . . . //(PE-LD-1+PE-LLD)//d describes a construction with an unspecified outer layer or outer layer sequence, followed by a layer substantially consisting of polyamide, followed by a layer substantially consisting of ethylene/vinyl alcohol/copolymerisate (E/VOH), followed by an unspecified layer or layer sequence, followed by a layer comprising a mixture of a polyethylene of low density (PE-LD-1) bearing the number 1 and an ethylene/$\alpha$-olefin-copolymerisate (PE-LLD), and a layer following on the sealing side to be more precisely specified by d.

Layers which primarily serve to mechanically connect the layers adjoining them on both sides will be designated in the following by . . . //BA// . . . , where BA is an abbreviation for bonding agent. Typical polymers used as bonding agents will be described later in the specification.

The indication of melting points relates in the following to the value determined according to ASTM 3418 by DSC analysis (differential scanning calorimetry analysis).

The indication of melt flow rates (MFR) relates in the following to the value determined in accordance with DIN ISO 1133. If no further indications are given, the measuring condition in the form of temperature and bearing mass will be assumed as condition D in DIN ISO 1133 with a temperature of 190° C. and a bearing mass of 2.16 kg.

The density of the raw materials relates to the measuring method according to ISO 1183 (A).

The relevant prior art has long consisted of the use of composite films comprising a stabilising layer or layer sequence and a sealing layer which, in contact with a further sealing layer, facilitates an impervious packaging by bonding following melting.

Polyethylene or copolymerisates based on ethylene and other comonomers constitute preferred sealing materials due to the low melting point of these systems, in particular in the case of the packaging of heat-sensitive meat goods. Sealing media based on polypropylene or propylene-based copolymerisates are not suitable here due to the high sealing temperatures.

Films whose stabilising layer(s) consist(s) of polyamide are normally used for the packaging of perishable foodstuffs due to their balanced pattern of properties: deep-drawability, toughness and temperature-resistance. Polyamide 6 again is normally used for this purpose.

Constructions according to the prior art are described, for example, in "The Wiley Encyclopaedia of Packaging Technology" (pub. M. Bakker. D. Eckroth; John Wiley & Sons, 1986) and in "Nentwig" (Joachim Nentwig: Kunststoff-Folien, Carl Hanser Verlag 1994, Munich).

A UV radiation barrier can be achieved not only by the use of organic UV absorbers, but also by the use of solid fillers. However, so as not to impair the transparency of the films too greatly, the solid fillers must be present in adequately finely dispersed form, although the particles should not be too fine so as to comply with the required interaction with UV radiation.

The use of fine-particulate titanium dioxide ($TiO_2$) is also known. Thus U.S. Pat. No. 5,391,609 discloses the use of nano-scale $TiO_2$ in the particle size range of 10 nm to 50 nm as additive for the acquisition of a UV barrier while retaining sufficiently good transparency. Particularly good results are achieved with TiO$_2$ in the particle size range of 18 nm to 40 nm. These systems are described in polypropylene and ethylene/propylene-copolymerisates.

In practice however, as stated above, polypropylene-based films prove distinctly inferior to polyamide in terms of puncture strength, and to ethylene-copolymerisates and polyethylene in terms of the commencement of sealing. In this respect the theory described in U.S. Pat. No. 5,391,609 cannot be utilized for the present requirement.

SUMMARY OF THE INVENTION

The objective was to make available a film which, in addition to good UV-absorption capability, also has a high degree of transparency and possesses good deep-drawability with good mechanical strength and can be sealed at low temperatures.

In accordance with the present invention, there is provided a multi-layer film comprising:
  (a) at least one first layer (i) of polyamide;
  (b) at least one second layer (ii) of polyethylene or an ethylene-copolymerisate containing fine-particulate titanium dioxide, a majority of the titanium dioxide particles having a diameter of between 5 and 30 nm;
  (c) optionally at least one EVOH-containing third layer; and
  (d) optionally at least one bonding layer,
  wherein said multi-layer film has a value of from 5 to 200, as determined from the summation of the product of the following equation (I) for all second layers of said multi-layer film, $$(A \times B) \qquad \text{Equation (I)}$$

equation (I) being calculated for each second layer, in equation (I) A is the thickness of said second layer in micrometers, and B is the weight percent of titanium dioxide present in said second layer, based on the total weight of said second layer.

Other than in the operating examples, or where otherwise indicated, all numbers expressing quantities of ingredients, reaction conditions, etc. used in the specification and claims are to be under stood as modified in all instance by the term "about."

DETAILED DESCRIPTION OF THE INVENTION

Preferably the lengths of the primary particles of the titanium dioxide in the numerically weighted average amount to at least three times their diameter and thus possess a needle-shaped appearance. Primary particles means the majority of the TiO$_2$ particles. Particularly preferably, the lengths of the primary particles of the titanium dioxide in the numerically weighted average amount to at least four times their diameter.

The multi-layer film can contain a plurality of layers (ii). In a preferred embodiment of the present invention, the multi-layer film according to the invention comprises only one layer (ii). In a further embodiment of the present invention, the multi-layer film has a value of from 10 to 100, as determined from the summation of equation (I) and as described previously herein.

A favorable embodiment of the multi-layer film according to the present invention comprises titanium dioxide with primary particles which in the numerically weighted average have a diameter of not less than 7 nm and not more than 25 nm (i.e., from 7 to 25 nm). In a further embodiment of the multi-layer film according to the invention, the titanium dioxide particles are oriented in the longitudinal direction of the film.

To prevent excessive embrittlement, the multi-layer film according to the present invention preferably contains no titanium dioxide in the first polyamide-containing layer (i).

In yet a further preferred embodiment of the present invention, the second layer(s) (ii) contain(s) polymers or mixtures of polymers selected from the group comprising copolymerisates of ethylene and vinyl acetate (E/VA), particularly preferably with a vinyl acetate content, relative to the total weight of the polymer, of at the maximum 20%, copolymerisates of ethylene and unsaturated esters such as butyl acrylate or ethyl acrylate (E/BA or E/EA), copolymerisates of ethylene and unsaturated carboxylic acids (E/AA, E/MAA), particularly preferably with a content of the carboxylic acid comonomer, relative to the total weight of the polymer, of a maximum of 15%, and in a more preferred form a maximum of 8%, salts of the copolymerisates of ethylene and unsaturated carboxylic acids, in particular E/MAA (ionomers), particularly preferably with a content of the carboxylic acid comonomer, relative to the total weight of the ionomer, of a maximum of 15%, and in a more preferred form a maximum of 10%, polyethylene of low density (PE-LD), particularly preferably in a density of at least 0.91 g/cm$^3$ and at the maximum 0.935 g/cm$^3$, polyethylene of high density (PE-HD), copolymerisates (PE-LLD) of ethylene and α-olefins with at least 3 C-atoms, for example butene, hexene, octene, 4-methyl-1-pentene. The copolymerisates (PE-LLD) of ethylene and α-olefins can be produced using conventional catalysts or metallocene catalysts, as is known to the skilled artisan.

In a preferred embodiment of the present invention, the first layer(s) (i) contain no thermoplastic materials other than polyamide. In a preferred embodiment, the polyamide constituting the first layer(s) (i) in each case contains a polyamide or a mixture of different polyamide with at least 90 wt. % polyamide 6 or a copolyamide with at least 90 wt. % units formed from ε-caprolactam. In addition to polyamide 6, it is also possible to use polyamides selected from the group comprising polyamide 10, polyamide 12, polyamide 66, polyamide 610, polyamide 6I, polyamide 612, polyamide 6/66, polyamide 6I/6T, polyamide MXD6, polyamide 6/6I, polyamide 6/6T, polyamide 6/IPDI or other aliphatic or aromatic homo- and copolyamides or mixtures thereof. It is particularly favourable to use no other polyamide apart from polyamide 6 in the first layer(s) (i).

In addition to the first layer(s) (i) and the second layer(s) (ii), the multi-layer film according to the present invention may also optionally contain one or more EVOH-containing layers (EVOH=ethylene/vinyl alcohol-copolymerisate) to improve the oxygen blocking properties, where the EVOH-containing layers preferably contain at least 50 wt. %, relative to the total weight of the relevant EVOH-containing layer, of an EVOH comprising at least 85 and at the maximum 40 mol % vinyl acetate which is at least 90% saponified. In a particularly preferred embodiment of the present invention, an EVOH-containing layer is positioned between two polyamide-containing first layers (i).

In addition to first layer(s) (i) and second layer(s) (ii) and optionally one or more EVOH-containing layer(s), the film according to the invention may optionally contain one or more bonding layers. Such a bonding layer is preferably a laminating adhesive based on polyurethanes or polyesterurethanes or an extrudable bonding agent.

In addition to the first layer(s) (i) and the second layer(s) (ii), and optionally one or more EVOH-containing third layer(s) and/or optionally one or more bonding layer(s), the multi-layer film according to the present invention may also further optionally contain additional polymeric layers.

The multi-layer film according to the present invention can be produced using standard equipment for the production of multi-layer films by co-extrusion and/or lamination.

It is preferable to incorporate the titanium dioxide in the second layer(s) (ii) via a concentrate generally also referred to as master batch, by adding the master batch to a further polymer and the common decomposition thereof to form a melt in an extruder.

The film according to the present invention exhibits a desirable absorption of ultraviolet light even up to a wavelength of approximately 350 nm. The transparency of the multi-layer film, however, is not permanently impaired in an undesirable manner.

The good elongation, deep-drawability and toughness of the multi-layer film according to the present invention compared to a film with a polyamide mono-layer filled with titanium dioxide proved surprising. With the same titanium-dioxide content, the polyamide mono-layer filled with $TiO_2$ proves to be considerably embrittled and no longer plastically deformable.

The multi-layer film according to the present invention possesses a permanent seal attainable even at low temperatures.

The invention further relates to the use of the multi-layer film according to the present invention as a packaging material for foodstuffs.

The present invention is more particularly described in the following examples, which are intended to be illustrative only, since numerous modifications and variations therein will be apparent to those skilled in the art. Unless otherwise specified, all parts and percentages are by weight.

EXAMPLES

Comparative Example 1

A multi-layer film of the construction PA6//laminating adhesive//(sealing layer) wherein the thicknesses in the sequence are 50, 2 and 50 μm, respectively, was produced by lamination. The sealing layer are 50% PE-LLD+50% PELD1. The ethylene/butene copolymerisate (PE-LLD) has a density of 919 g/cm$^3$, a melting point of 124° C. and a melt flow rate (MFR) of 4.4 g/10 min at 190° C. and 2.16 kg, the additive-free PE-LD-1 has a density of 920 g/cm$^3$, a melting point of 108° C. and a MFR of 1 g/10 min at 190° C. and 2.16 kg. The laminating adhesive is a polyurethane-based system. PA6 has a crystallite melting point of 220° C.

Comparative Example 2

A multi-layer film similar to Comparative Example 1, but containing 0.4 wt. % titanium dioxide in the PA6 layer. The titanium dioxide was incorporated by means of a master batch based on PA 6/IPDI containing 10 wt. % titanium dioxide.

Comparative Example 3

A multi-layer film similar to Comparative Example 1, but containing 1.0 wt. % of $TiO_2$ in the PA6 layer. The titanium dioxide was incorporated as in Comparative Example 2 by means of a master batch based on PA 6/IPDI containing 10 wt. % titanium dioxide.

Example 4
(Representative of the Present Invention)

A multi-layer film similar to Comparative Example 1, but containing (50% PE-LLD+48% PE-LD-1+2% PE-LD-2 with titanium dioxide) as sealing layer. The titanium dioxide used was needle-shaped, the primary particles possessing an average diameter of 15 nm and an average length of 70 nm. The titanium dioxide was incorporated by means of a LDPE-based master batch PE-LD-2 containing 20 wt. % titanium dioxide. The PE-layer thus contains 0.4 wt. % titanium dioxide.

Example 5
(Representative of the Present Invention)

A multi-layer film similar to Example 4, but containing (50% PE-LLD+49% PE-LD-1+5% PE-LD-2 with titanium dioxide) as sealing layer. The titanium dioxide was incorporated by means of the LDPE-based master batch PE-LD-2 from Example 4 containing 20 wt. % titanium dioxide. The PE-layer 1 thus contains 1 wt. % titanium dioxide.

The following properties were measured for the example films according to the invention and in the comparison examples.

The elongation at break was determined in accordance with DIN EN ISO 527 at a temperature of 23° C. and a relative moisture of 50%. The sample was acclimatized in the measuring conditions for 48 hours prior to measurement.

The opacity was determined in accordance with ASTM D 1003.

The light transmission of the multi-layer films was determined at a wavelength of 300 nm, using a single-beam spectral photometer (Zeiss PMQ II) with a quartz double monochromator.

The test results are summarised in the following table.

| Feature | Unit | Example (B) and Comparison Example (V) | | | | |
|---|---|---|---|---|---|---|
| | | V1 | V2 | V3 | B4 | B5 |
| TiO$_2$ Constituent | μm wt. % | 0 | 20 | 50 | 20 | 50 |
| TiO$_2$-containing layer | layer | — | PA | PA | PE | PE |
| Longitudinal elongation at break | % | 430 | 10 | 50 | 410 | 450 |
| Transmission at 300 nm | % | 83 | 23 | <1 | 20 | <1 |
| Opacity | % | 13 | 18 | 28 | 17 | 26 |

In the above table: B4 and B5 refer to Examples 4 and 5, which are representative of multi-layer films according to the present invention; and V1, V2 and V3 refer to the multi-layer films of Comparative Examples 1, 2 and 3.

The present invention has been described with reference to specific details of particular embodiments thereof. It is not intended that such details be regarded as limitations upon the scope of the invention except insofar as and to the extent that they are included in the accompanying claims.

What is claimed is:

1. A multi-layer film comprising
   (a) at least one first layer of polyamide;
   (b) at least one second layer of polyethylene or an ethylene-copolymerisate containing fine-particulate titanium dioxide, a majority of the titanium dioxide particles having a diameter of between 5 and 30 nm and lengths which are at least three times their diameter;
   (c) optionally at least one ethylene/vinyl alcohol-copolymerisate-containing third layer; and
   (d) at least one bonding layer, wherein said multi-layer film has a value of from 5 to 200, as determined from the summation of the product of the following equation (I) for all second layers of said multi-layer film, $$(A \times B) \qquad (I)$$

equation (I) being calculated for each second layer, in equation (I) A is the thickness of said second layer in micrometers, and B is the weight percent of titanium dioxide particles in said second layer, based on the total weight of said second layer.

2. The multi-layer film of claim 1 wherein said multi-layer film contains a single second layer.

3. The multi-layer film of claim 1 wherein said value, determined from the summation of equation (I), is from 10 to 100.

4. The multi-layer film of claim 1 wherein the diameter of a majority of the titanium dioxide particles is from 7 and 25 nm.

5. The multi-layer film of claim 1, wherein the lengths of a majority of the titanium dioxide particles are at least four times their diameter.

6. The multi-layer film of claim 5, wherein the titanium dioxide particles are oriented in the longitudinal direction of the film.

7. The multi-layer film of claim 1, wherein said bonding layer is selected from polyurethane laminating adhesives, polyesterurethane laminating adhesives and mixtures thereof.

8. A method for packaging foodstuffs, which comprises packaging said foodstuffs in a multi-layer film according to claim 1.

* * * * *